Patented Apr. 10, 1923.

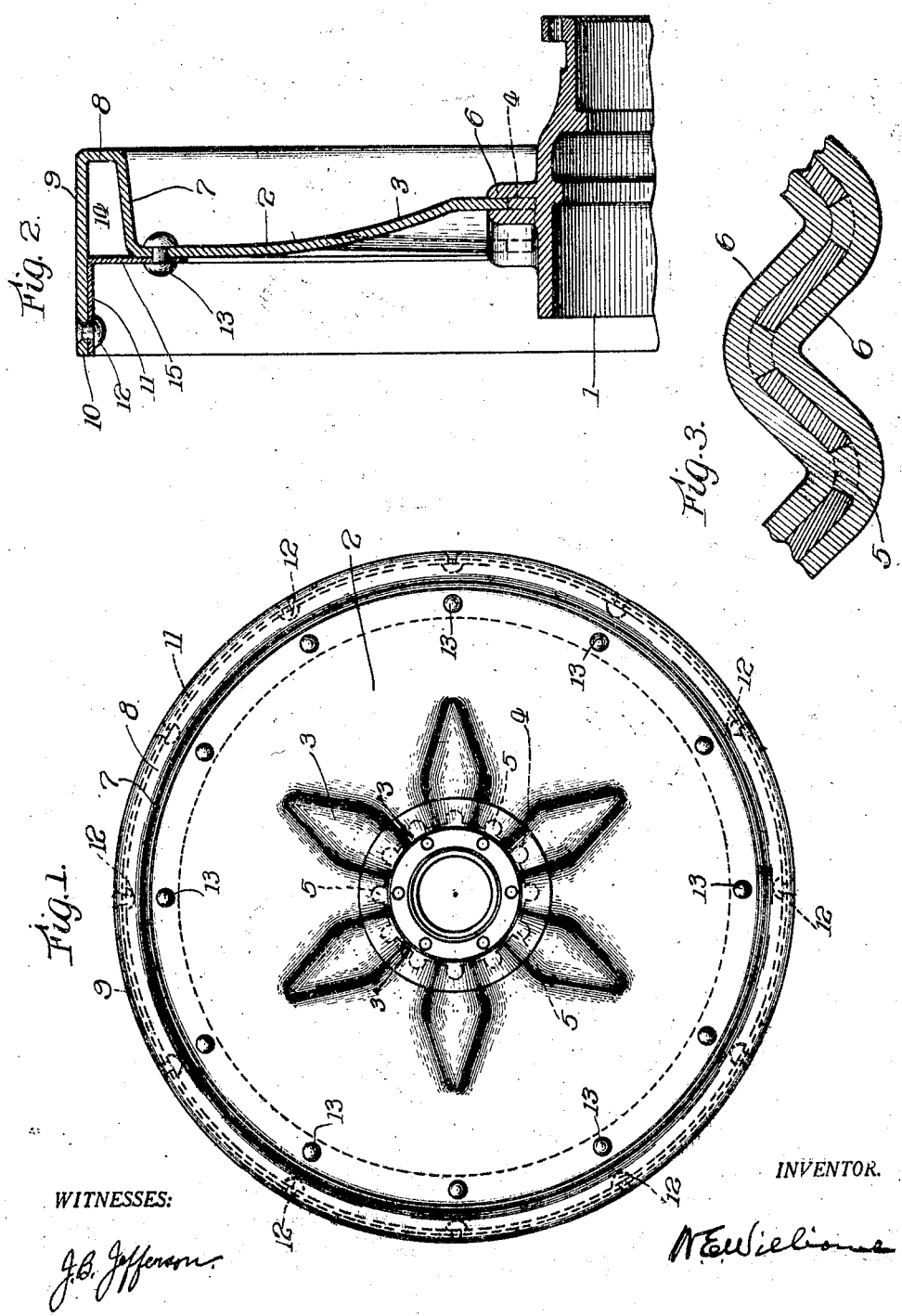

1,451,354

UNITED STATES PATENT OFFICE.

WILLIAM ERASTUS WILLIAMS, OF CHICAGO, ILLINOIS.

CORRUGATED-PLATE WHEEL.

Application filed December 5, 1919. Serial No. 342,577.

*To all whom it may concern:*

Be it known that I, WILLIAM ERASTUS WILLIAMS, a citizen of the United States, a resident of Chicago, in the county of Cook and State of Illinois, have invented a new and useful Improvement in Corrugated-Plate Wheels, of which the following is a specification.

The object of my invention is to make an automobile wheel of the disk type, that will be very strong and cheaply made.

The invention is set forth in the claims.

Reference will be had to the accompanying drawing, in which Figure 1 is a front elevation of the wheel.

Figure 2 is a radial section on a larger scale than that of Figure 1, showing only one-half of the wheel.

Figure 3 is a section on line 3—3 of Figure 1.

In the drawing 1 indicates the hub of a wheel of the ordinary type for automobile trucks, here shown as being a front wheel. The web of the wheel is made of a flat plate disk 2 having, for lateral stiffening purposes, around its central opening radial corrugations 3 lying wholly on one side of the plane of the non-corrugated body of the disk. At that opening, the disk has marginal notches or punched holes 4 which cut away portions of the general marginal curve.

The hub is cast-on and the molten metal runs through these holes 4 as is indicated by 5 in Figure 3. The metal of the hub is provided with a double walled ruffled flange 6, which follows the contour of the corrugations around the hub barrel, and the outline of this double wall flange is shown by Figure 3.

The tread of the wheel is formed by having the metal of the plate 2 bent forward as is indicated at 7 and then vertically as indicated at 8, forming a simulation in appearance to the front edge of a wheel having a wooden felloe. This metal is then turned over into the rim of the wheel as indicated at 9.

The outer edge 10 of the tread portion 9 of the wheel is reinforced by an angle ring 11, which is riveted at 12 to the edge 10 of the rim. The other leg of the angle 11 is riveted at 13 to the body of the plate 12 and then there is produced the enclosed box region 14 on the tread of the wheel.

This is a cheap method of making a wheel and it makes a very strong wheel.

The arrangement of the plate 2 in the region of the rivets 13, where it joins the inside leg of the angle ring 11, is approximately in the center plane of the tread load of the wheel.

The arrangement of this angle ring 11 is such that a stock section of angles may be used, which permits the cheapest type of material to be furnished for this purpose.

This vertically arranged leg of the angle 11 I indicate at 15, and it is a desideratum to have it in a direct line of the load thrust of the wheel, as I have shown it.

It is obvious from the construction that as radial corrugations stiffen the inner marginal portion of the disk which especially needs strength, so corrugating the thin hub flanges adds to their stiffness and to that of the embraced disk, and further, that integrally uniting these flanges at short intervals, as shown in Figs. 2 and 3, makes them mutually supporting whereby this most heavily strained portion of the wheel resists any side thrust insufficient to bend at once the three corrugated members, which are virtually one member having a broad base at the periphery of the hub proper, or hub body.

What I claim is:—

1. The combination with a single disk wheel having one disk face in a plane parallel to the general plane of the wheel with its central zone pressed outward on one side from said plane to form corrugations extending from the medial zone of the disk nearly to the corresponding end of the hub to brace the disk and stiffen the hub, said hub having wide thin serpentine cast-on flanges, whereby a thin walled hub has its main strain-bearing middle portion greatly strengthened from end to end of that portion.

2. In a wheel of the class described, a pressed plate forming the disk and rim of the wheel, the said disk dished for stiffness and having its web, where it joins the felloe region, in a close approximation to the center load line of the wheel, and with a reinforcing angle having a vertically arranged flange supporting a part of the rim portion inward into the vertically arranged zone of the plate.

3. In a wheel of the class described, a plate dished to give stiffness and corrugated where it joins the hub for the purpose of aiding in lateral stiffness and with a smooth zone where it joins the felloe regions and with a boxed-in rim portion produced by drawing the plate forward and then backward to form the rim.

4. In a wheel of the class described, a pressed plate having the rim portion formed by bending the plate in a box sectional form, with one side of the box section closed in by a right angled ring secured to the rim member and also to the vertical plain section of the wheel web.

5. A wheel disk having a plane outer non-corrugated zone and a central zone with deep radial corrugations formed on one side of the plane of the outer zone, combined with a cast-on hub lying in the central opening of the disk and having two thin parallel circumferential flanges corrugated like the inner margin of the disk and rigidly holding the marginal portion between them.

Signed at Chicago, in the county of Cook and State of Illinois.

WILLIAM ERASTUS WILLIAMS.

Witnesses:
J. B. JEFFERSON,
B. J. BERNHARD.